United States Patent [19]
Diamanti

[11] 3,886,145
[45] May 27, 1975

[54] NEW DERIVATIVE OF TRIAMCINOLONE
[75] Inventor: Enrico Diamanti, Rome, Italy
[73] Assignee: Sigma-Tau Industrie Farmaceutiche/Riunite S.p.A., Italy
[22] Filed: Apr. 23, 1973
[21] Appl. No.: 353,680

[30] Foreign Application Priority Data
Apr. 28, 1972 Italy .................................. 49946/72

[52] U.S. Cl. ........................ 260/239.55 D; 424/241
[51] Int. Cl. ........................................... C07c 173/00
[58] Field of Search .................. Machine Searched Steroids

[56] References Cited
UNITED STATES PATENTS

| | | | |
|---|---|---|---|
| 2,990,401 | 6/1961 | Bernstein et al. | 260/239.55 |
| 3,035,050 | 5/1962 | Hydorn | 260/239.55 |
| 3,048,581 | 8/1962 | Fried | 260/239.55 |
| 3,197,469 | 7/1965 | Fried | 260/239.55 |
| 3,488,727 | 1/1970 | Diassi et al. | 260/239.55 |

Primary Examiner—Henry A. French
Attorney, Agent, or Firm—Robert E. Burns; Emmanuel J. Lobato; Bruce L. Adams

[57] ABSTRACT

A novel triamcinolone derivative 21-($\beta$-benzoylaminoisobutyryl) -16$\alpha$, 17$\alpha$- (p-dimethylaminobenzyliden) triamcinolone is disclosed. It is prepared by ketalizing or acetalizing the 16$\alpha$ and 17$\alpha$ hydroxyl groups of triamcinolone with the appropriate benzaldehyde followed by esterification of the 21-hydroxyl group with a strongly reactant $\beta$-benzylaminoisobutyric acid derivitive.

1 Claim, No Drawings

NEW DERIVATIVE OF TRIAMCINOLONE

This invention relates to a new derivative of triamcinolone, 21-(β-benzoylaminoisobutyryl)-16α, 17α-(p-dimethylaminobenzyliden) triamcinolone having the following formula:

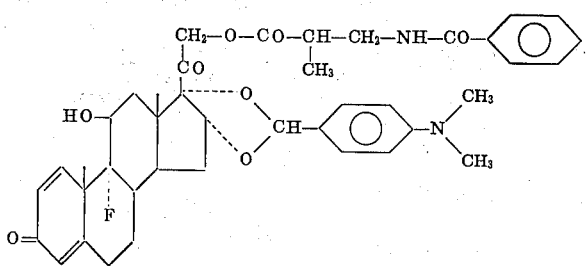

to processes for preparing it and to a novel intermediate therefor.

This new derivative of triamcinolone is obtained first by ketal preparation on 16α and 17α Hydroxyl groups with p-dimethylaminobenzaldehyde to form the 16α, 17α-(p-dimethylaminobenzyliden)-triamcinolone intermediate and then by the 21 Hydroxyl group esterification of this intermediate with chloride or imidazolide or mixed anhydride of β-benzoylaminoisobutyric acid.

The ketal preparation on the 16α - 17α Hydroxyl groups of triamcinolone is carried out in an inert, organic solvent such as dioxane, tetrahydrofuran, N,N-dimethylformamide, using an acid as catalyst, e. g. 70% perchloric acid or gaseous hydrochloric acid.

The esterification at the 21 position of the intermediate is then carried out in an inert, organic, anhydrous solvent such as dioxane, tetrahydrofuran, N,N-dimethylformamide at a temperature between about 10° and 50°C. When the chloride of β-benzoylaminoisobutyric acid is used, this operation must be effected in the presence of an halogenhydric acid proton acceptor. Pyridine is used preferably, as it also serves as a solvent.

The antiphlogistic properties of the 21-(β-benzoylaminoisobutyryl)- 16α, 17α(p-dimethylaminobenzyliden)-triamcinolone thus obtained were studied on test animals and the product was compared with the most active corticosteroid esters. The product according to the present invention has shown to be very active. The product is equal in thymolytic and glucocorticoid effects and has a more efficacious antiphlogistic activity (in topical use) than triamcinolone acetonide and betamethasone-17-valerate. Similar to the above mentioned active corticosteroids, 21 - (β-benzoylaminoisobutyryl) - 16α , 17-α-(p-dimethylaminobenzyliden) - triamcinolone does not show any sodium-retentive action.

The following examples illustrate the synthetic preparation of the product. The reaction parameters, reactants and media mentioned therein are merely exemplary. Art recognized variations and equivalents are intended within the scope of the process aspects of this invention.

EXAMPLE 1

16α, 17α-(p-dimethylaminobenzyliden)-triamcinolone

Dissolve 4 gm. of triamcinolone in 100 cc. of dioxane and 10 cc. of N,N-dimethylformamide. To the solution, at room temperature, add 4.5 gm. of p-dimethylaminobenzaldehyde, and 2 cc. of 70% perchloric acid. Stir for three hours. Pour in 2 liters of a saturated solution of sodium bicarbonate diluted with 2 liters of water. Filter the precipitate, wash with water and dry. Then wash with ethyl ether. 5.2 gm of 16α, 17-α-(p-dimethylaminobenzyliden)-triamcinolone are obtained, which after crystallization with methyl alcohol yield 4.5 gm. of crystalline product.

Melting point = 257° - 8°C
Yield = 85%

EXAMPLE 2

21-(β-benzoylaminoisobutyryl) - 16α, 17α-(p-dimethylaminobenzyliden) - triamcinolone 828 mg. of β-benzoylaminoisobutyric acid are suspended in 4 cc. of anhydrous methylene chloride. Add at 0.5°C cc. 0.6 of thionyl chloride.

Heat to room temperature and store for 48 hours. Then concentrate the solution and dissolve the residue in 10 cc. of N,N-dimethylformamide. This solution is added at 0.5°C to 840 mg. of 16α, 17α-(p-dimethylaminobenzyliden) - trimacinolone dissolved in 10 cc. of N,N-dimethylformamide and 6 cc. of anhydrous pyridine. Store for 4 hours at 0.5°C and then add 500 cc. of sodium bicarbonate saturated solution. The solid precipitate is filtered, washed with a little water and dried at 40°C under vacuum. 1.2 gm. of microcrystalline product are obtained.

Melting point = 140°C (with decomposition)
Yield = 80%

In the above example, the β-benzoylaminoisobutyric acid may be replaced by β-benzoylaminoiso-butyric chloride or anhydride in equivalent amount.

The pharmaceutical compositions of this invention comprise the active ingredient incorporated into pharmaceutically acceptable carriers or diluents. The compositions may take any of the forms customarily employed for the administration of therapeutically active substances, but the preferred types include; pills and capsules for oral administration, tablets, including sustained release formulations, for parental administration, solutions and suspensions, and forms adaptable for external application such as lotions or unguents. The tablets and pills may be formulated in the usual manner with one or more pharmaceutically acceptable diluents or excipients, and can include lubricants useful in the tablet making art. Capsules made of adsorbable material such as gelatin, may contain the active substance alone or in a mixture, with a solid or liquid diluent. Liquid preparations may be in the form of suspensions, emulsions, syrups or elixirs of the active substance in water or with other suitable media commonly used for making orally acceptable pharmaceutical preparations. For external use, it is preferred to dissolve or suspend the active ingredient in an emolient liquid such as purified corn oil or to emulsify it therein and then to incorporate this liquid into a suitable ointment base such as into petrolatum. By first diluting the active ingredient into the emolient liquid, adequate distribution of the active material is assured throughout the ointment base.

EXAMPLE 3

One gram of 21-(β-benzoylaminoisobutyryl)-16α,

17α-(p-dimethylaminobenzaldene)-triamcinolone is dissolved in one liter of purified corn oil. The thus obtained solution is then filtered. Soft gelatin capsules are then filled each with 0.25 ml. of this solution. This comprises dosage forms of the active ingredient suitable for oral administration.

EXAMPLE 4

25 grams of 21-(β-benzoylaminoisobutyryl)-16α, 17-α-(p-dimethylaminobenzaldene)-triamcinolone is triturated with 100 ml. of purified corn oil. The thus obtained liquid is then incorporated into 1 kg of U.S.P. ointment base comprising petrolatum with purified wax incorporated therein to provide a suitable melting point at just below surface body temperature. The resultant ointment is then subdivided and filled into ointment tubes.

I claim:
1. A new derivative of triamcinolone 21-(β-benzoylaminoisobutyryl)- 16α, 17α-(p-dimethylaminobenzyliden) triamcinolone having the following formula:

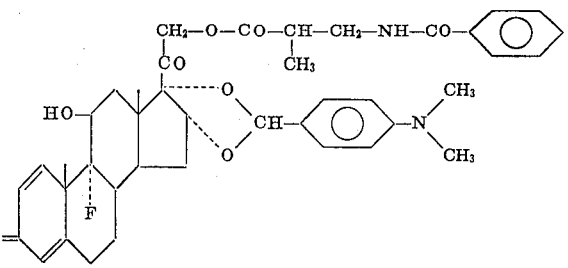

* * * * *